United States Patent
Stammer et al.

(10) Patent No.: US 10,332,697 B2
(45) Date of Patent: Jun. 25, 2019

(54) ENCAPSULATION OF COMPONENTS AND A LOW ENERGY CIRCUIT FOR HAZARDOUS LOCATIONS

(71) Applicant: Hoffman Enclosures, Inc., Anoka, MN (US)

(72) Inventors: Scott Dean Stammer, Champlin, MN (US); La Her, St. Paul, MN (US); William Martin, Coon Rapids, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 0 days.

(21) Appl. No.: 15/406,422

(22) Filed: Jan. 13, 2017

(65) Prior Publication Data

US 2017/0125181 A1     May 4, 2017

Related U.S. Application Data (63) Continuation of application No. 14/488,150, filed on Sep. 16, 2014, now Pat. No. 9,559,517.

(51) Int. Cl.
*H01H 9/04* (2006.01)
*H02H 7/20* (2006.01)
(Continued)

(52) U.S. Cl.
CPC .............. *H01H 9/042* (2013.01); *F25B 31/00* (2013.01); *H01H 9/04* (2013.01); *H01H 35/26* (2013.01);
(Continued)

(58) Field of Classification Search
CPC ........ H01H 9/042; H01H 35/26; H01H 45/14; F25B 31/00
(Continued)

(56) References Cited

U.S. PATENT DOCUMENTS

| | | | |
|---|---|---|---|
| 3,024,596 A * | 3/1962 | Hatfield | ............... F02K 7/00 244/3.16 |
| 3,514,967 A | 6/1970 | Vander | |

(Continued)

FOREIGN PATENT DOCUMENTS

| | | |
|---|---|---|
| CA | 2208943 C | 1/1998 |
| CN | 101105328 A | 1/2008 |

(Continued)

OTHER PUBLICATIONS

EIC Solutions Enclosures and Cooling Systems Engineered for Reliability; CP Series—14000—20000 BTU Compressor-Based Enclosure Air Conditioner; Copyright 2015 EIC Solutions; retrieved from U.S. Patent Office Records—U.S. Pat. No. 9,559,517; 4 pages.

(Continued)

*Primary Examiner* — Bickey Dhakal
(74) *Attorney, Agent, or Firm* — Quarles & Brady LLP (57) ABSTRACT

Embodiments of the disclosure provide an encapsulated compressor overload, an encapsulated compressor relay start, an encapsulated head pressure control switch and a wiring diagram for a circuit for air conditioning units which prevent gases from being ignited by means of encapsulating sparking components, use of solid-state switching devices, and/or wiring circuits in such a way that open contacts do not contain enough energy to produce a spark capable of igniting the atmosphere.

19 Claims, 5 Drawing Sheets

(51) Int. Cl.
H01H 35/26 (2006.01)
F25B 31/00 (2006.01)
H01H 45/14 (2006.01)
H01H 37/04 (2006.01)

(52) U.S. Cl.
CPC .............. *H01H 45/14* (2013.01); *H02H 7/20* (2013.01); *H01H 37/04* (2013.01)

(58) Field of Classification Search
USPC .......................................................... 361/22
See application file for complete search history.

(56) References Cited

U.S. PATENT DOCUMENTS

| | | | | |
|---|---|---|---|---|
| 3,800,111 | A * | 3/1974 | Holmstrom | H01B 3/447 174/110 V |
| 3,911,693 | A * | 10/1975 | Seigler | F24F 1/02 62/151 |
| 3,913,342 | A | 10/1975 | Barry | |
| 3,982,405 | A * | 9/1976 | Seigler | F24F 1/02 327/456 |
| 4,034,337 | A * | 7/1977 | Haddock | B60K 15/05 340/430 |
| 4,038,507 | A * | 7/1977 | Murphy, Jr. | F01M 11/061 137/448 |
| 4,205,246 | A * | 5/1980 | Wise | H02K 5/136 310/68 C |
| 5,192,194 | A * | 3/1993 | Birdwell | F25B 31/02 310/88 |
| 5,515,217 | A * | 5/1996 | Higashikata | H01H 37/5436 361/103 |
| 5,657,641 | A * | 8/1997 | Cunningham | H05K 7/20536 361/691 |
| 6,064,064 | A * | 5/2000 | Castleman | G08B 17/12 250/339.05 |
| 6,101,829 | A * | 8/2000 | Robinson | F24F 1/0014 62/259.1 |
| 6,345,511 | B1 * | 2/2002 | Esty | F24F 13/32 62/259.1 |
| 6,357,249 | B1 * | 3/2002 | Robinson | B60H 1/00364 62/244 |
| 6,542,062 | B1 * | 4/2003 | Herrick | H01H 61/02 318/783 |
| 6,548,924 | B2 * | 4/2003 | Furukawa | F04B 35/04 310/68 C |
| 6,571,572 | B2 * | 6/2003 | Hobbs | F24F 13/20 361/679.46 |
| 7,798,183 | B2 * | 9/2010 | Cegelski | B29C 73/166 141/38 |
| 7,893,380 | B2 * | 2/2011 | Moore | H01H 33/76 218/158 |
| 8,108,082 | B2 | 1/2012 | Yeh et al. | |
| 8,600,559 | B2 | 12/2013 | Grohman et al. | |
| 8,939,524 | B2 | 1/2015 | Gasser | |
| 8,978,392 | B2 * | 3/2015 | Blackway | F25B 21/02 62/3.62 |
| 9,025,353 | B2 * | 5/2015 | Birnbach | G05F 1/10 363/178 |
| 2003/0151861 | A1 * | 8/2003 | Moore, Jr. | H01R 13/5216 361/22 |
| 2007/0158874 | A1 * | 7/2007 | van Herpt | B29C 70/548 264/257 |
| 2008/0237194 | A1 * | 10/2008 | Moore | C08K 5/0008 218/158 |
| 2009/0291007 | A1 * | 11/2009 | Yamaoka | F04B 39/1073 417/569 |
| 2009/0301601 | A1 * | 12/2009 | Enerson | C06B 43/00 141/38 |
| 2012/0267069 | A1 * | 10/2012 | Seeliger | F24F 13/30 165/86 |
| 2013/0186010 | A1 | 7/2013 | Condie | |
| 2013/0314873 | A1 * | 11/2013 | Shibata | H05K 7/20818 361/696 |
| 2014/0000299 | A1 | 1/2014 | Maust et al. | |
| 2015/0114022 | A1 | 4/2015 | Kreeley et al. | |

FOREIGN PATENT DOCUMENTS

| | | |
|---|---|---|
| CN | 201007529 Y | 1/2008 |
| CN | 201074888 Y | 6/2008 |
| CN | 201373511 Y | 12/2009 |
| CN | 201934128 U | 8/2011 |
| CN | 201954711 U | 8/2011 |
| CN | 202119052 U | 1/2012 |
| CN | 202145029 U | 2/2012 |
| CN | 202250143 U | 5/2012 |
| CN | 202250144 U | 5/2012 |
| CN | 202546936 U | 11/2012 |
| CN | 102889638 A | 1/2013 |
| CN | 102889646 A | 1/2013 |
| CN | 202769872 U | 3/2013 |
| CN | 202902480 U | 4/2013 |
| CN | 202902482 U | 4/2013 |
| CN | 103196184 A | 7/2013 |
| EP | 0860667 A1 | 8/1998 |
| EP | 1707891 A1 | 10/2006 |
| EP | 2493277 A2 | 8/2012 |

OTHER PUBLICATIONS

ICEqube Hazardous Location Air Conditioner Certifications; Copyright 2015 Ice Qube Inc.; retrieved from U.S. Patent Office Records—U.S. Pat. No. 9,559,517; 7 pages.
Friedrich Hazardgard®; Copyright 2015 Friedrich; retrieved from U.S. Patent Office Records—U.S. Pat. No. 9,559,517; 5 pages.
Thermal Edge Inc.; Hazardous Location; Copyright 2015 Thermal Edge; retrieved from U.S. Patent Office Records—U.S. Pat. No. 9,559,517; 4 pages.
Durable Machinery Company; Air Conditional for Hazardous/Explosion-Proof/Flameproof/Rugged Conditions; Copyright 2006-2012 Durable Machinery Company, LLC; retrieved from U.S. Patent Office Records—U.S. Pat. No. 9,559,517; 2 pages.
Kooltronic Thermal Management for Enclosures; Copyright 1996-2015 Kooltronic, Inc.; retrieved from U.S. Patent Office Records—U.S. Pat. No. 9,559,517; 2 pages.
International Search Report for PCT/US2015/050265; dated Jan. 11, 2016; 4 pages.

* cited by examiner

ENCAPSULATION OF COMPONENTS AND A LOW ENERGY CIRCUIT FOR HAZARDOUS LOCATIONS

RELATED APPLICATIONS

This application is a continuation of co-pending U.S. application Ser. No. 14/488,150 filed Sep. 16, 2014, the entire disclosure of which is incorporated herein by reference.

BACKGROUND

The present disclosure relates generally to air conditioning units for use in a hazardous environment where flammable gases or vapors may exist. In particular, the present disclosure relates to air conditioning units which prevent gases from being ignited by encapsulating sparking components, using solid-state switching devices, and/or wiring circuits in such a way that open contacts do not contain enough energy to produce a spark capable of igniting the atmosphere.

In many applications, it is necessary to provide air conditioning or refrigeration systems in locations where flammable gases or vapors exist. For example, a worker may be surrounded by atmospheric conditions conducive to danger. An oxygen rich atmosphere might be particularly conducive to flash fire caused by a stray spark. A similar condition could exist in a dust laden atmosphere or in an atmosphere which includes flammable vapors. At such locations, it is necessary to provide protection against the ignition of such flammable gases or vapors, in order to prevent the occurrence of highly undesired explosions.

In the prior art, explosion-proofing techniques included creating a purged and pressurized system to create a non-hazardous environment, or adding a large cast explosion proof enclosure to contain any undesired explosions and placing any sparking devices within the explosion proof enclosure. However, these explosion proof techniques were unduly complicated and expensive because purge and pressurization devices required shop air, and large cast explosion proof enclosures are bulky and expensive. Further, these bulky enclosures significantly increased the size of the hazardous location rated air conditioners.

SUMMARY OF THE INVENTION

The present disclosure includes a compressor overload for use with air conditioning or refrigeration systems in a hazardous location where flammable gases or vapors may exist, comprising: a thermal sensor, at least one overload terminal, a base bracket, a disc, at least one wire configured to attach to the at least one overload terminal, and encapsulation material wherein the encapsulation material forms an air tight cover surrounding the compressor overload.

The present disclosure also includes a compressor start relay for use with air conditioning or refrigeration systems in a hazardous location where flammable gases or vapors may exist, comprising at least one relay terminal, at least one wire coupled onto the at least one relay terminal, and encapsulation material wherein the encapsulation material forms an air tight cover completely surrounding the compressor start relay.

The present disclosure includes a wiring circuit for air conditioning or refrigeration systems in a hazardous location where flammable gases or vapors may exist, comprising a compressor, a transformer, a high energy circuit, a low energy circuit, a solid state relay wherein a first portion of the solid state relay is configured to connect to the high energy circuit and a second portion of the solid state relay is configured to connect to the low energy circuit, and a line voltage.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," "attached" and "coupled" and variations thereof are used broadly and encompass both direct and indirect mountings, connections, supports, and couplings. Further, "connected," "attached" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

A compressor overload 10, a compressor start relay 30 and a pressure switch 50 are each components which can form a part of an air conditioning unit. Any of these components have the potential to create a spark during ordinary use. A spark could lead to an explosion if any of these components are used in a hazardous location where ignitable concentrations of flammable gases or vapors may be present. Therefore, it is desirable to encapsulate these components within an air tight material to prevent any potential sparks from mixing with flammable gases or vapors which may exist in the surrounding environment.

Figure 1:
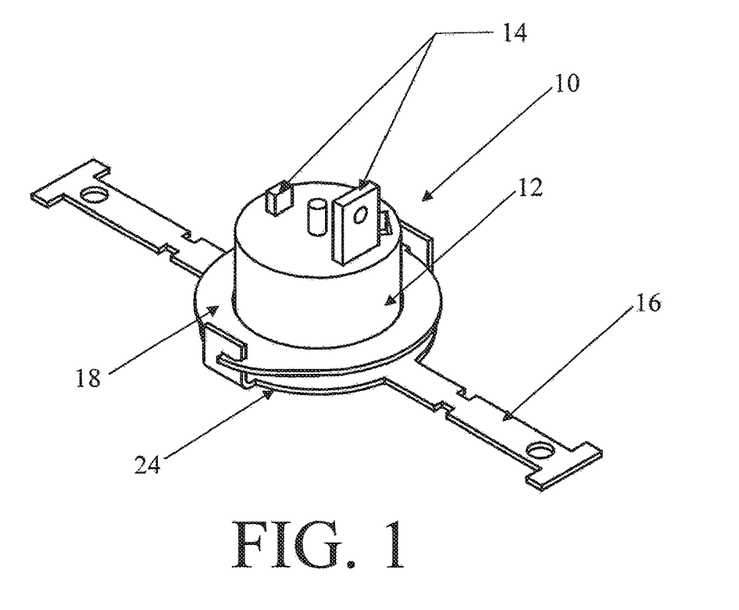
FIG. 1 is a perspective view of a compressor overload.

FIG. 1 shows one embodiment of a compressor overload 10 having a thermal sensor 12, overload terminals 14, a base bracket 16 and a disc 18. In this embodiment, the disc 18 is configured to be coupled to the base bracket 16. The disc 18 can be rotated and locked into the base bracket 16. In one embodiment, wires 19 (shown in FIG. 2) can be attached to the overload terminals 14. The wires 19 can be coupled to the overload terminals 14 by soldering them onto the terminals 14 or by various other attachment means known in the art.

Figure 2:
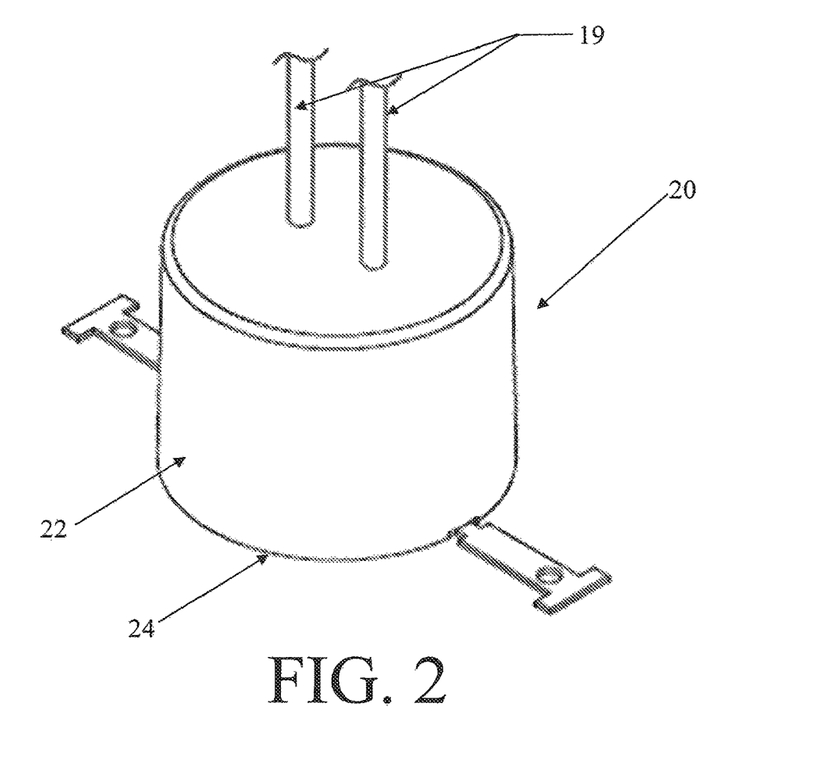
FIG. 2 is a perspective view of the compressor overload of FIG. 1, showing the compressor overload enclosed in encapsulating material.

A compressor overload 10 can create a spark during operation, which could cause a potential explosion in a hazardous environment. Therefore it is desirable to contain the sparking components of the compressor overload 10 within an air tight encapsulation material 22 to prevent any potential sparks from coming into contact with nearby flammable gases or vapors. FIG. 2 shows an embodiment of an encapsulated compressor overload 20. In this embodiment, components of the compressor overload 10 such as the thermal sensor 12, overload terminals 14 and disc 18 are completely covered by the encapsulation material 22. The encapsulation material 22 can also cover a portion of the base bracket 16 and a portion of the wires 19.

Various other combinations can be used where different combinations of components can be enclosed by the encapsulation material 22 as long as the components which are capable of creating a spark are completely contained within the encapsulation material 22. The encapsulation material 22 forms an air tight cover surrounding the compressor overload 10. In one embodiment the encapsulation material 22 forms a cylindrical cover over the thermal sensor 12, overload terminals 14, base bracket 16 and disc 18. However various different shapes can be used for the encapsulation material 22 as long as the shape creates an air tight seal over the potential sparking components. The requirement of an air tight seal also applies where the base bracket 16 and wires 19 extend up to or through the encapsulation material 22.

In one embodiment, the bottom surface 24 of the base bracket 16 is not covered by the encapsulation material 22 and sits flush with the encapsulation material 22. The thermal sensor 12 is located next to the base bracket 16, which is thermally conductive, to allow the thermal sensor 12 to sense temperature through the bracket 16. The bottom surface 24 of the base bracket 16 is not covered by any encapsulation material 22 to allow the thermal sensor 12 to sense temperature through the base bracket 16.

In one embodiment, the following steps can be used to encapsulate a compressor overload 10. A user can take a compressor overload 10 and attach wires 19 to the overload terminals 14 of the compressor. This form of attachment includes but is not limited to direct coupling or soldering. The base bracket 16 and disc 18 can be cleaned with a cleaning agent such as isopropyl alcohol before being coupled together. After cleaning the base bracket 16 and disc 18, the user can rotate the disc 18 into the base bracket 16 and lock the bracket 16 and disc 18 together via various forms of engagement which are known in the art. In one embodiment, this form of engagement includes a protrusion on the disc 18 engaging an indentation on the bracket 16.

The user can also substantially or completely cover all the electrically live parts of the compressor overload 10 with a silicone sealant which can be flame resistant. An electrically live part is any part which has electricity flowing through it. In one embodiment, this flame resistant sealant has a thickness sufficient to meet the UL 94 V-0 minimum flammability rating which is a standard that classifies plastics according to how they burn in various orientations and thicknesses. The UL 94 V-0 is a plastics flammability standard released by Underwriters Laboratories of the USA. In one embodiment this minimum thickness is 5.4 millimeters. The user can locate or otherwise create a casting or mold in a desired shape for the encapsulation material 22. In the embodiment shown in FIG. 2, the mold has a cylindrical shape but it should be understood to one of ordinary skill in the art that various other shapes can be used as well to suit a user's needs.

After obtaining a mold, the user places the compressor overload 10 and any attached wires 19 inside the mold. The user can then pour liquid encapsulation material into the mold to completely encapsulate the compressor overload 10 and any attached wires 19. After hardening, the encapsulation material 22 creates an air tight seal around the compressor overload 10 and wires 19 to ensure that any potential spark is completely contained within the encapsulation material 22 and cannot interact with any gases or vapors outside the encapsulation material 22. In one embodiment, the encapsulation material 22 can be a polyurethane resin and/or can have a thickness of one-quarter inch all around. In another one embodiment, the encapsulation material 22 can be poured to be flush with the bottom surface 24 of the base bracket 16.

Figure 3:
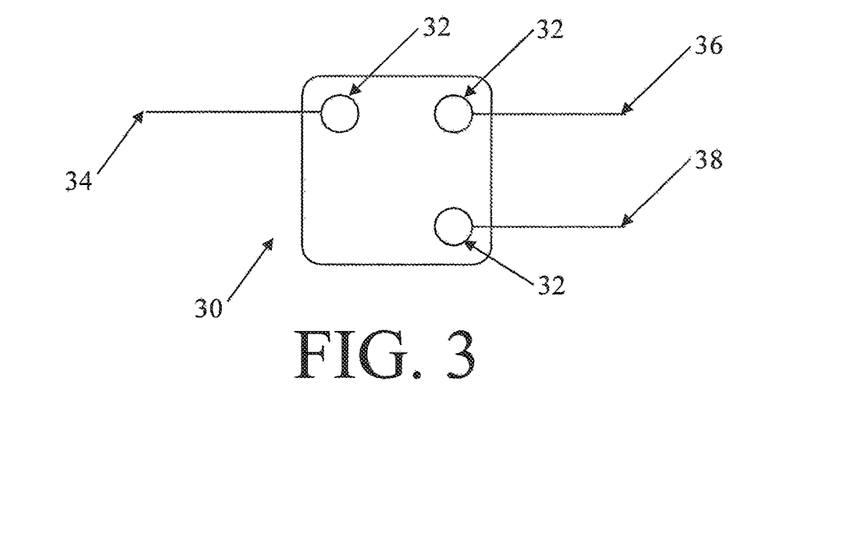
FIG. 3 is a schematic wiring diagram of a compressor relay start.

FIG. 3 shows a wire diagram of one embodiment of a compressor potential start relay 30 having relay terminals 32, a first wire 34, a second wire 36 and a third wire 38. It should be understood to one of ordinary skill in the art that the compressor start relay 30 is not solely limited to the use of three wires as shown in FIG. 3, but can use a varying number of wires. In one embodiment, the first 34, second 36, and third 38 wires can be attached to individual relay terminals 32. The wires 34, 36, 38 can be coupled to the relay terminals 32 by soldering them onto the terminals 14 or by various other attachment means known in the art.

Figure 4:
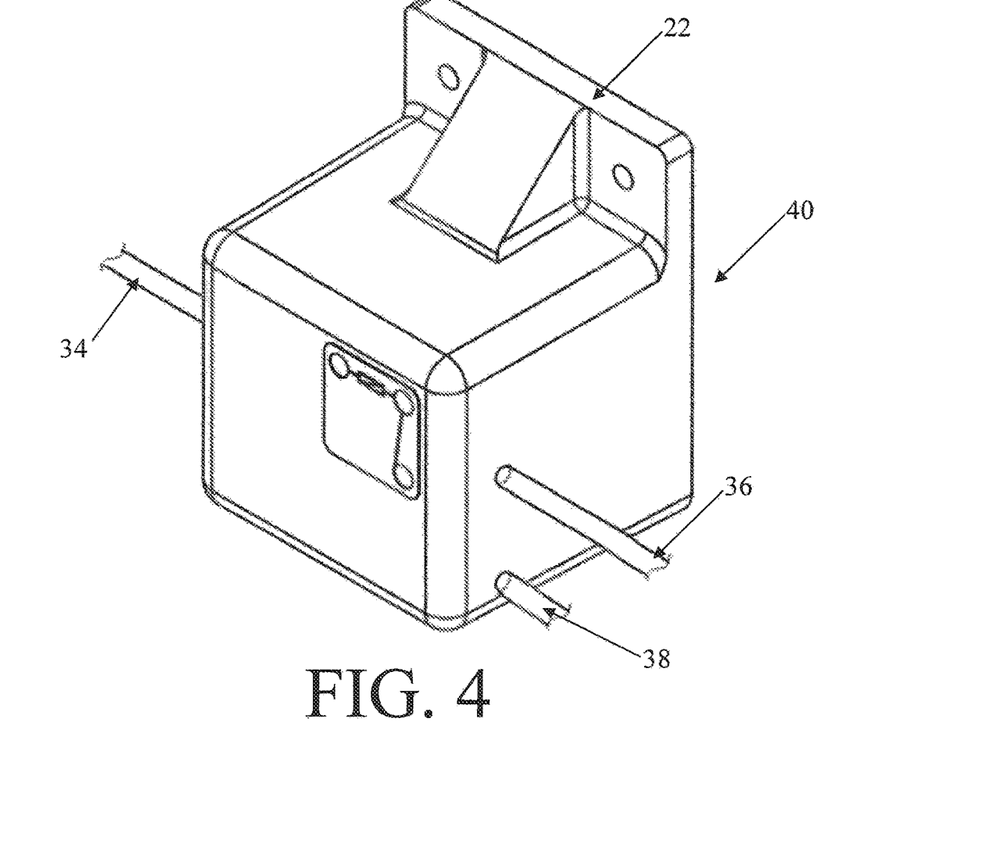
FIG. 4 is a perspective view of the compressor relay start of FIG. 3, showing the compressor relay start enclosed in encapsulating material.

Because a spark can be created during operation of the compressor start relay 30, it is desirable to contain the sparking components within an air tight encapsulation material 22 to prevent any potential sparks from coming into contact with the nearby flammable gases or vapors. FIG. 4 shows one embodiment of an encapsulated compressor start relay 40. In this embodiment, the compressor start relay 30 and relay terminals 32 are completely covered by the encapsulation material 22. The encapsulation material 22 can also cover a portion of the wires 34, 36, 38. The encapsulation material 22 creates an air tight seal over any potential sparking components. While FIG. 4 shows a boxed shape for the encapsulation material 22, it is understood that any shape which creates an air tight seal over the potential sparking components can be used. The requirement of an air tight seal also applies where the wires 34, 36, 38 extend through the encapsulation material 22.

In one embodiment, the following process can be used to encapsulate a compressor start relay 30. A user can take a compressor start relay 30 and solder or otherwise attach wires 34, 36, 38 to the individual relay terminals 32 of the start relay 30. The user can also substantially or completely cover all the electrically live parts of the compressor start relay 30 with a flame resistant sealant such as silicone. In one embodiment, this flame resistant sealant has a thickness sufficient to meet the UL 94 V-0 minimum flammability rating minimum which in one instance can be 5.4 millimeters. Then the user can locate or otherwise create a casting or mold in a desired shape for the encapsulation material 22. In the embodiment shown in FIG. 4, the mold has a boxed shape with a flange at one end, but it should be understood to one of ordinary skill in the art that various other shapes could be used as well.

After obtaining a mold, the user places the compressor start relay 30 with wires 34, 36, 38 inside the mold. The user can then pour liquid encapsulation material into the mold to completely encapsulate the compressor start relay 30 and wires 34, 36, 38. The encapsulation material 22 creates an air tight seal around the compressor start relay 30 and wires 34, 36, 38 to ensure that any potential spark is completely contained within the encapsulation material 22 and cannot interact with any gases or vapors outside the encapsulation material 22. In one embodiment, the encapsulation material 22 can be a polyurethane resin and can have a thickness of one-quarter inch all around.

Figure 5:
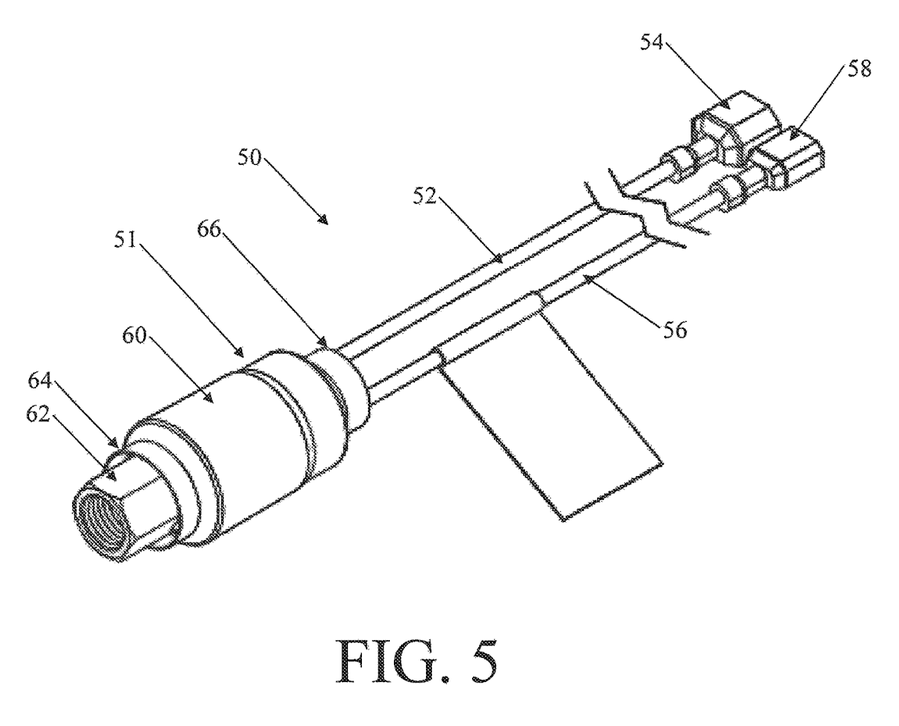
FIG. 5 is a perspective view of a pressure switch with its body wrapped in heat shrink tubing.

FIG. 5 illustrates one embodiment of a pressure switch 50 having a body portion 51, a first wire 52 with a first connector 54, a second wire 56 with a second connector 58, heat shrink tubing 60, and a third connector 62. It should be understood to one of ordinary skill in the art that the pressure switch 50 is not solely limited to the use of two wires as shown in FIG. 5.

Because a spark can be created during operation of the pressure switch 50, it is desirable to contain the sparking components within an air tight tube 60 to prevent any potential sparks from coming into contact with nearby flammable gases or vapors. FIG. 5 shows one embodiment of an encapsulated pressure switch 50. In this embodiment, the body portion 51 of the pressure switch 50 is surrounded by tube 60. The tube 60 can also cover a portion of the wires 52, 56. In one embodiment, a sealant material such as a polyurethane resin can be applied near the first 64 and second 66 edges of the tubing to create an air tight seal. The sealant material creates an air tight seal where the first wire 52, second wire 56, and third connector 62 extend past the first 64 and second 66 edges of the tubing 60 respectively. In one embodiment, the sealant material seals the body portion 51, tube 60, first wire 52, second wire 56, and third connector 62 such that these components all rotate together when any of the portion of the body portion 51, tube 60, first wire 52, second wire 56, or third connector 62 is rotated.

In one embodiment, the following process can be used to encapsulate a pressure switch 50. A user can take a pressure switch 50 and place heat shrink tubing 60 over a body portion 51 of the pressure switch 50. The heat shrink tubing 60 should extend past and cover all the components within the body portion 51 which can create a spark. The user can apply heat to the tubing 60 to shrink it down and conform the tubing 60 to the body portion 51 of the switch 50. The user can also apply a sealant material such as a polyurethane resin near the first 64 and second 66 edges of the tubing 60. The sealant material should not exceed the first 64 and second 66 edges of the tubing 60 and combined with the tubing 60, should create a completely air tight seal around the body 51 of the pressure switch 50. Creating an air tight seal around the body 51 should completely seal off the sparking components within the heat shrink tubing 60 which eliminates the risk that these sparking components could ignite nearby flammable gases or vapors present in a hazardous location.

By sealing off the sparking components 10, 30, 50 individually, a user avoids having to use alternative safeguards such as a purged and pressurized air system to prevent hazardous outside air from coming into contact with a spark. A purged and pressurized air system can be both complicated and expensive. Similarly, a user also avoids having to use an alternative such as building out a large east explosion-proof enclosure and placing all of the sparking components within this enclosure. Placing all of the potential sparking components in a single enclosure requires reconfiguring the overall size and shape of the air conditioner to accommodate having all the sparking components in one central location.

The present disclosure allows a user to seal off each sparking component individually and therefore allows a user to avoid having to install a purged and pressurized air system, thus enabling the user to maintain the same overall size and shape of a non-hazardous location air conditioner. This results in a lower overall cost and creates a compact self-contained cooling device.

Another way to provide protection against the potential ignition of flammable gases or vapors is to wire the air conditioner to make use of a low energy circuit where the energy is a function of the voltage and current in a circuit. The low energy circuit is sufficiently low in energy such that it does not contain enough energy to produce a spark capable of igniting the surrounding atmosphere.

Figure 6:
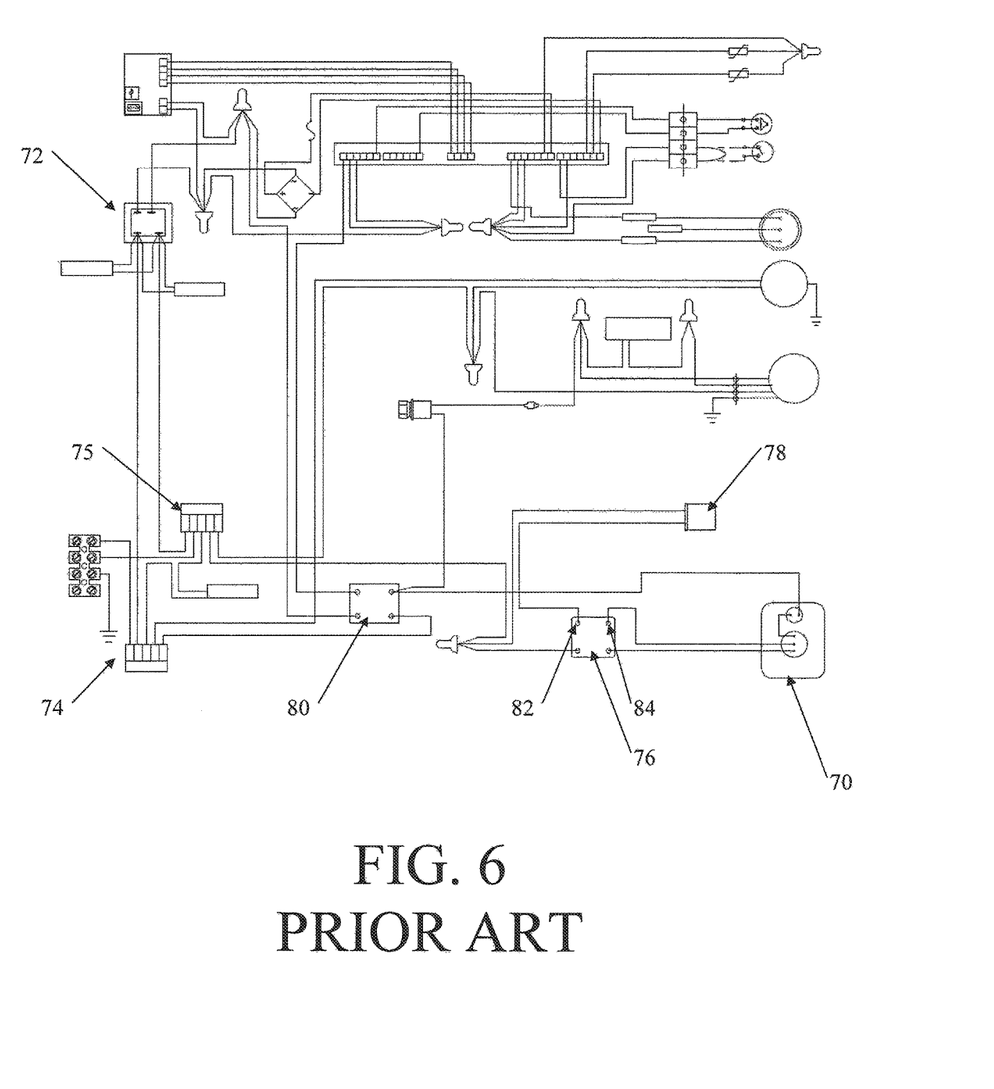
FIG. 6 is a schematic wiring diagram of a start circuit, shown as prior art.

FIG. 6 illustrates a wiring diagram of an air conditioning unit according to the prior art. In this air conditioning unit, the wiring for the compressor 70 uses high voltage throughout the entirety of its circuit and thus is powered by a high energy circuit. The compressor 70 is directly connected to a compressor start relay 76, which in turn is connected to a compressor start capacitor 78. The compressor start capacitor 78 is connected to the compressor 70 which is also wired to a mechanical contactor 80. The mechanical contactor 80 is directly connected to the line voltage 74. Thus, the compressor 70 is connected to the line voltage 74 and uses high voltage throughout its circuit. Because the compressor wiring uses high voltage throughout its circuit, there is a potential for a spark to be created in the compressor start relay 76 between connection points 82, 84. To remove the potential for a spark, the compressor wiring can be reconfigured as shown in FIG. 7.

Figure 7:
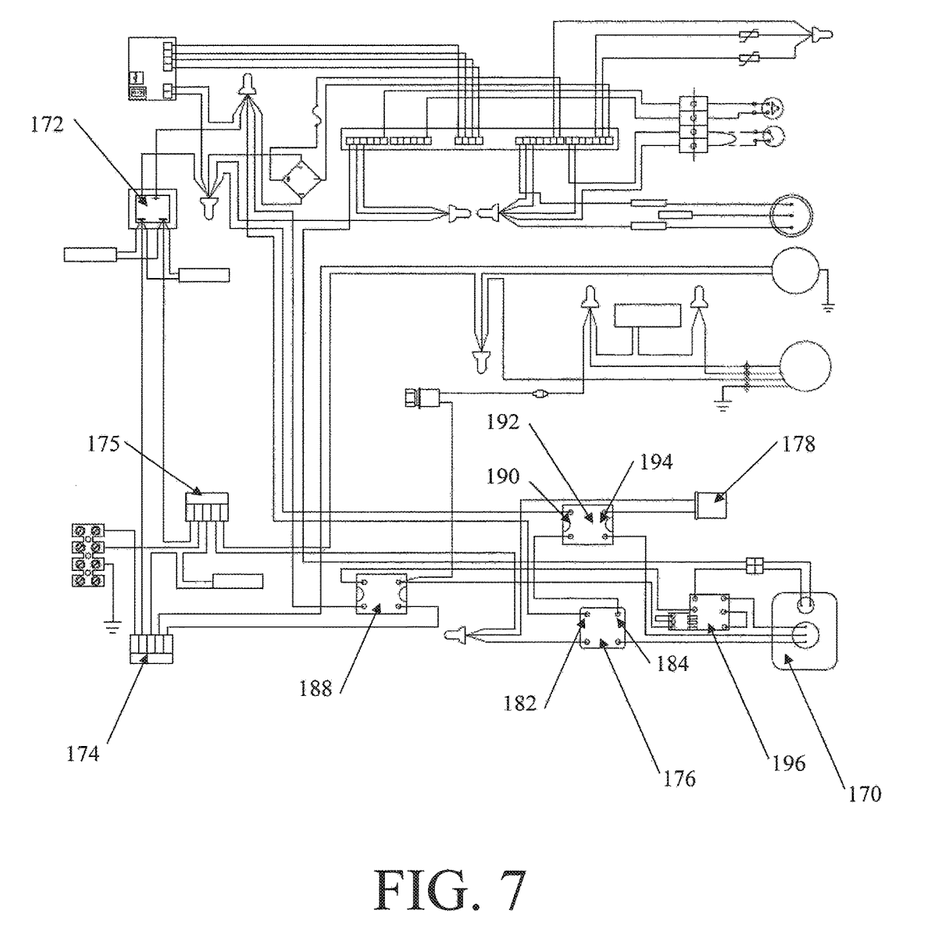
FIG. 7 is a schematic wiring diagram of the start circuit of FIG. 6, where a low energy circuit has been added.

FIG. 7 illustrates a wiring diagram of one embodiment of an air conditioning unit where a low energy circuit has been introduced into the compressor wiring. That same principles discussed below would also apply to wiring for a refrigeration unit. In this circuit, the wiring for the compressor 170 uses both high voltage and low voltage. The compressor 170 is connected to a first solid state relay 188 and a compressor start relay 176. The compressor start relay 176 is connected to a second solid state relay 192. A first side 190 of the second solid state relay 192 is connected to the secondary side of the step down transformer 172 and thus operates on low voltage. However, a second side 194 of the second solid state relay 192 is wired to a start capacitor 178, which is connected to line voltage 175, and therefore it operates on high voltage. The line connections between the connection points 182, 184 of the compressor start relay 176 and the first side 190 of the second solid state relay 192 all use low voltage and therefore operate on a low energy circuit.

The second side 194 of the second solid state relay 192 is connected to the start capacitor 178, which in turn is connected to the line voltage 175. Therefore, the second side 194 of the second solid state relay 192 operates on high voltage and a high energy circuit because it is powered by line voltage 175.

By introducing a low energy circuit, the spark potential in the compressor start relay 176 between connection points 182, 184 has been removed because these connection points 182, 184 are now wired to the secondary side of the step down transformer 172. In one embodiment, the line voltage 174 on the primary side of the transformer is 115 volts and the low voltage on the secondary side of the transformer 172 is 24 volts. Thus the connection points 182, 184 are now wired using low voltage which does not contain enough energy to produce a spark capable of igniting the gases and vapors in the surrounding hazardous environment.

In one embodiment, an overcurrent relay 196 is added to the circuit in order to provide protection against excessive currents. To further eliminate the potential for a spark, the mechanical contactor 80 (shown in FIG. 6) has been replaced by a solid state relay 188 which does not create a spark potential. Thus, by introducing a low energy circuit and replacing the mechanical contactor 80 with a solid state relay 188, the potential for sparking has been significantly reduced. The low energy circuit eliminates the need for any type of encapsulation, explosion-proof enclosure or purge and pressurization device.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto.

The invention claimed is:

1. An apparatus for preventing ignition of flammable gases and vapors in an environment surrounding an air conditioning system, the air conditioning system including a compressor and a transformer, the apparatus comprising:
   a sparking component for use in the air conditioning system, the sparking component receiving electrical power through one or more electrically live parts, the sparking component potentially producing sparks from one or more of the electrically live parts;
   an encapsulation material forming an air tight cover surrounding the sparking component such that sparks created by the sparking component are completely contained within the encapsulation material and prevented from coming into contact with the flammable gases and vapors; and
   a wiring circuit electrically connecting the sparking component, the compressor, and the transformer of the air conditioning system to a line voltage, the wiring circuit comprising:
   a high energy circuit;
   a low energy circuit;
   a solid state relay, wherein a first portion of the solid state relay is configured to connect to the high energy circuit and a second portion of the solid state relay is configured to connect to the low energy circuit; and
   a compressor start relay, wherein a first portion of the compressor start relay is configured to connect to the high energy circuit and a second portion of the compressor start relay is configured to connect to the low energy circuit.

2. The apparatus of claim 1, wherein the encapsulation material encapsulates the sparking component individually with respect to other components of the air conditioning system.

3. The apparatus of claim 1, wherein the encapsulation material is applied to the sparking component before the apparatus is placed in an enclosure of the air conditioning system.

4. The apparatus of claim 1, wherein the encapsulation material is a polyurethane resin and is about one-quarter inch thick.

5. The apparatus of claim 1, wherein the encapsulation material is molded to the sparking component.

6. The apparatus of claim 1 wherein the sparking component is a compressor overload.

7. The apparatus of claim 6, wherein each of the one or more electrically live parts of the compressor overload is substantially covered with a silicone sealant.

8. The apparatus of claim 1, wherein the sparking component is a compressor start relay.

9. The apparatus of claim 8, wherein the compressor start relay comprises a plurality of relay terminals each attached to a corresponding wire of a plurality of wires, the encapsulation material allowing the plurality of wires to extend through the air tight cover.

10. The apparatus of claim 8, wherein each of the one or more electrically live parts of the compressor start relay is substantially covered with a silicone sealant.

11. The apparatus of claim 1 wherein the sparking component is a pressure switch.

12. The apparatus of claim 11, wherein the encapsulation material comprises a tube, each of the one or more electrically live parts of the pressure switch capable of creating a spark being disposed within the tube.

13. The apparatus of claim 12, wherein the tube comprises a first edge and a second edge opposite the first edge, and wherein the encapsulation material further comprises a sealant material applied to the tube at the first edge and at the second edge to form the air tight cover.

14. An apparatus for controlling power to a compressor of an air conditioner, the apparatus comprising:
   at least one sparking component receiving electrical power through one or more electrically live parts of the sparking component, the sparking component capable of producing sparks from one or more of the electrically live parts;
   one or more portions of encapsulating material, each of the at least one sparking component having a corresponding portion of the one or more portions, the corresponding portion forming an air tight cover surrounding the sparking component such that sparks created by the sparking component are completely contained within the corresponding portion of encapsulation material and prevented from coming into contact with flammable gases and vapors in a vicinity of the air conditioner; and
   a wiring circuit electrically connecting the at least one sparking component, the compressor, and a transformer of the air conditioner to a line voltage, the wiring circuit comprising:
   a high energy circuit;
   a low energy circuit;
   a solid state relay, wherein a first portion of the solid state relay is configured to connect to the high energy circuit and a second portion of the solid state relay is configured to connect to the low energy circuit; and
   a compressor start relay, wherein a first portion of the compressor start relay is configured to connect to the high energy circuit and a second portion of the compressor start relay is configured to connect to the low energy circuit.

15. The apparatus of claim 14, wherein the at least one sparking component includes every electrical component disposed in the air conditioner and capable of producing sparks.

16. The apparatus of claim 14, wherein the at least one sparking component is configured to be directly electrically connected to the compressor, the at least one sparking component including one or both of a compressor overload and a compressor start relay.

17. The apparatus of claim 14, wherein the at least one sparking component includes a compressor start relay and the compressor start relay comprises:
   at least one relay terminal;
   at least one wire coupled onto the at least one relay terminal; and
   a first encapsulation material of the one or more portions of encapsulation material, the first encapsulation material forming the corresponding air tight cover over the compressor start relay.

18. The apparatus of claim 17, wherein the at least one wire is soldered onto the at least one relay terminal and the first encapsulation material creates an air tight seal around the at least one wire.

19. The apparatus of claim 17, wherein:
   each of the electrically live parts of the compressor start relay that are capable of producing a spark are substantially covered with a silicone sealant; and
   the first encapsulation material is a polyurethane resin.

* * * * *